US010330774B2

(12) United States Patent
Bialer et al.

(10) Patent No.: US 10,330,774 B2
(45) Date of Patent: Jun. 25, 2019

(54) METHOD AND APPARATUS FOR COMPUTATIONALLY EFFICIENT TARGET ACQUISITION AND TRACKING USING A RADAR

(71) Applicant: GM GLOBAL TECHNOLOGY OPERATIONS LLC, Detroit, MI (US)

(72) Inventors: Oded Bialer, Petah Tivak (IL); Igal Bilik, Rehovot (IL); Alexander Pokrass, Bat Yam (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 323 days.

(21) Appl. No.: 15/244,577

(22) Filed: Aug. 23, 2016

(65) Prior Publication Data
US 2018/0059214 A1    Mar. 1, 2018

(51) Int. Cl.
*G01S 7/292* (2006.01)
*G01S 7/41* (2006.01)
*G01S 13/72* (2006.01)
*G01S 13/58* (2006.01)
*G01S 13/526* (2006.01)
*G01S 13/93* (2006.01)
*G01S 7/288* (2006.01)
*G01S 13/86* (2006.01)
*G01S 13/66* (2006.01)
*G01S 13/00* (2006.01)

(52) U.S. Cl.
CPC .......... *G01S 7/2921* (2013.01); *G01S 7/288* (2013.01); *G01S 7/292* (2013.01); *G01S 7/414* (2013.01); *G01S 7/415* (2013.01); *G01S 13/526* (2013.01); *G01S 13/586* (2013.01); *G01S 13/66* (2013.01); *G01S 13/726* (2013.01); *G01S 13/86* (2013.01); *G01S 13/931* (2013.01); *G01S 13/865* (2013.01); *G01S 13/867* (2013.01); *G01S 2007/2883* (2013.01)

(58) Field of Classification Search
USPC ................................. 708/404, 405; 342/196
See application file for complete search history.

(56) References Cited

U.S. PATENT DOCUMENTS

| 3,680,105 A * | 7/1972 | Goldstone | G01S 13/28 342/189 |
| 4,028,700 A * | 6/1977 | Carey | G01S 13/282 342/194 |
| 4,084,148 A * | 4/1978 | Koshikawa | G01S 7/52036 342/192 |
| 5,302,955 A * | 4/1994 | Schutte | G01S 13/87 342/59 |
| 5,796,363 A * | 8/1998 | Mast | G01S 7/292 342/179 |
| 5,812,082 A * | 9/1998 | Moreira | G01S 13/90 342/162 |

(Continued)

*Primary Examiner* — Bernarr E Gregory
(74) *Attorney, Agent, or Firm* — Lorenz & Kopf LLP (57) ABSTRACT

The present invention generally relates to processing of electromagnetic signals, and more specifically, for a method and apparatus for managing the computational cost of radar signal processing on a vehicular radar. The system is operative to utilize a Goerzel filter to aid in determining a frequency for a radar echo. In addition the system uses a DFT operation for tracking stationary objects and a FFT operation for tracing moving objects.

18 Claims, 6 Drawing Sheets

| 200 | CONTROL SYSTEM | 222 | RECEIVER |
| 202 | SENSORY ARRAY | 224 | INTERFACE UNIT |
| 203 | RADAR SYSTEM | 226 | PROCESSING UNIT |
| 204 | ADDITIONAL SENSORS | 230 | PROCESSOR |
| 205 | CONTROLLLER | 232 | MEMORY |
| 210 | CAMERA(S) | 234 | INTERFACE |
| 212 | LIDAR(S) | 236 | STORAGE DEVICE |
| 220 | TRANSMITTER | 240 | PROGRAM |
|  |  | 242 | STORED VALUES |

(56) References Cited

U.S. PATENT DOCUMENTS

| | | | | |
|---|---|---|---|---|
| 5,910,785 A | * | 6/1999 | Normant | G01S 13/90 342/179 |
| 6,018,306 A | * | 1/2000 | Serbin | G01S 13/90 342/175 |
| 6,072,419 A | * | 6/2000 | Normant | G01S 13/282 342/194 |

* cited by examiner

METHOD AND APPARATUS FOR COMPUTATIONALLY EFFICIENT TARGET ACQUISITION AND TRACKING USING A RADAR

BACKGROUND OF THE INVENTION

Field of the Invention

The present invention generally relates to processing of electromagnetic signals, and more specifically, for a method and apparatus for managing the computational cost of radar signal processing on a vehicular radar.

Background Information

Certain vehicles today utilize radar systems for navigation or object detection. For example, certain vehicles utilize radar systems to detect other vehicles, pedestrians, or other objects on a road in which the vehicle is travelling and use this information to autonomously navigate around these objects. Radar systems may be used in this manner, for example, in implementing automatic braking systems, adaptive cruise control, and avoidance features, among other vehicle features. Certain vehicle radar systems, called multiple input, multiple output (MIMO) radar systems, have multiple transmitters and receivers. While radar systems are generally useful for such vehicle features, in certain situations existing radar systems may have certain limitations.

Accordingly, it is desirable to provide improved techniques for radar system performance in vehicles, for example, minimizing the computational cost of processing received radar signals. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an aspect of the present invention, an apparatus for processing a radar signal having a transmitter for transmitting a pulsed radar signal, a receiver for receiving a radar signal over a first time duration and a second time duration wherein the radar signal is a reflection of the pulsed radar signal, a processor for performing a fast fourier transform on said radar signal over a first bandwidth to generate a first filtered radar signal, determining if the first filtered radar signal indicates a stationary objection and for performing a discrete fourier transform on said radar signal over the first bandwidth in response to the determination that the first filtered radar signal indicates a stationary object.

In accordance with another aspect of the present invention, a method for receiving a radar signal over a first time duration, performing a fast Fourier transform on said radar signal over a first bandwidth to generate a first filtered radar signal, determining if the first filtered radar signal indicates a stationary objection, receiving the radar signal over a second time duration, and performing a discrete Fourier transform on said radar signal over the first bandwidth in response to the determination that the first filtered radar signal indicates a stationary object.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set 'out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

The present application teaches a method and system for reducing the computational expense of a radar system while maintaining high performance by utilizing simple and low complexity accurate target localization and tracking in range, Doppler and angle without using a frequency multiplier. Radar systems commonly utilize Fast Fourier Transform (FFT) computation to obtain a target's range and Doppler. The target tacking may be performed using a Kalman filter. Accuracy of both target location and tracking depends on the FFT length. An increase in the FFT length results in an increase of the system complexity and cost.

The presently described system and method implements a multi-resolution approach with low resolution during the search mode and high resolution during the tracking mode. The present system may or may not teach use of a Goerzel filter in the tracking mode in order to obtain the maximum signal at the desired frequency. The system and method benefit from a short FFT during the search/detection mode and a long DFT during the tracking mode. The system and method further benefit from simplicity of implementation which facilities frequency tuning through changing only a small number of filter parameters as opposed to implementation of a frequency multiplier.

Figure 1:
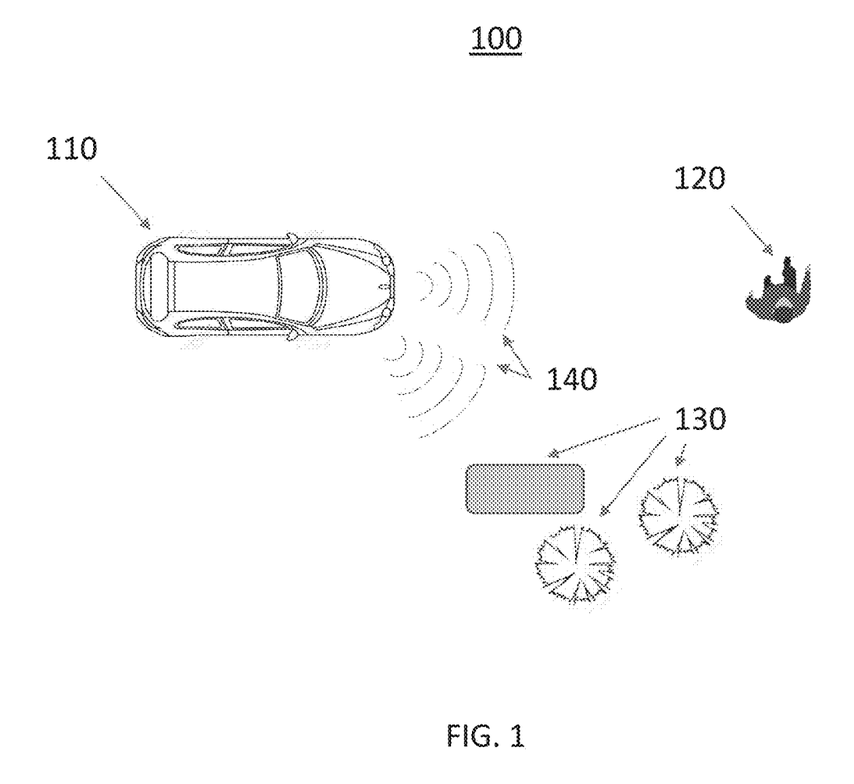
FIG. 1 is a diagram of an exemplary embodiment 100 of an environment for practicing the present system and method.

Referring now to the drawings, and more particularly to FIG. 1, a diagram of an exemplary embodiment 100 of an environment for practicing the present invention is shown. The vehicle 110 is equipped with a radar system operative to transmit and receive electromagnetic waves 140. The radar system is used to locate objects proximate to the vehicle in order for the systems within the vehicle to control the vehicle in light of the located objects. Some objects may be stationary 130 and some objections may be mobile 120. Furthermore, the vehicle 110 is further equipped with a control system for implementation of the radar system.

Figure 2:
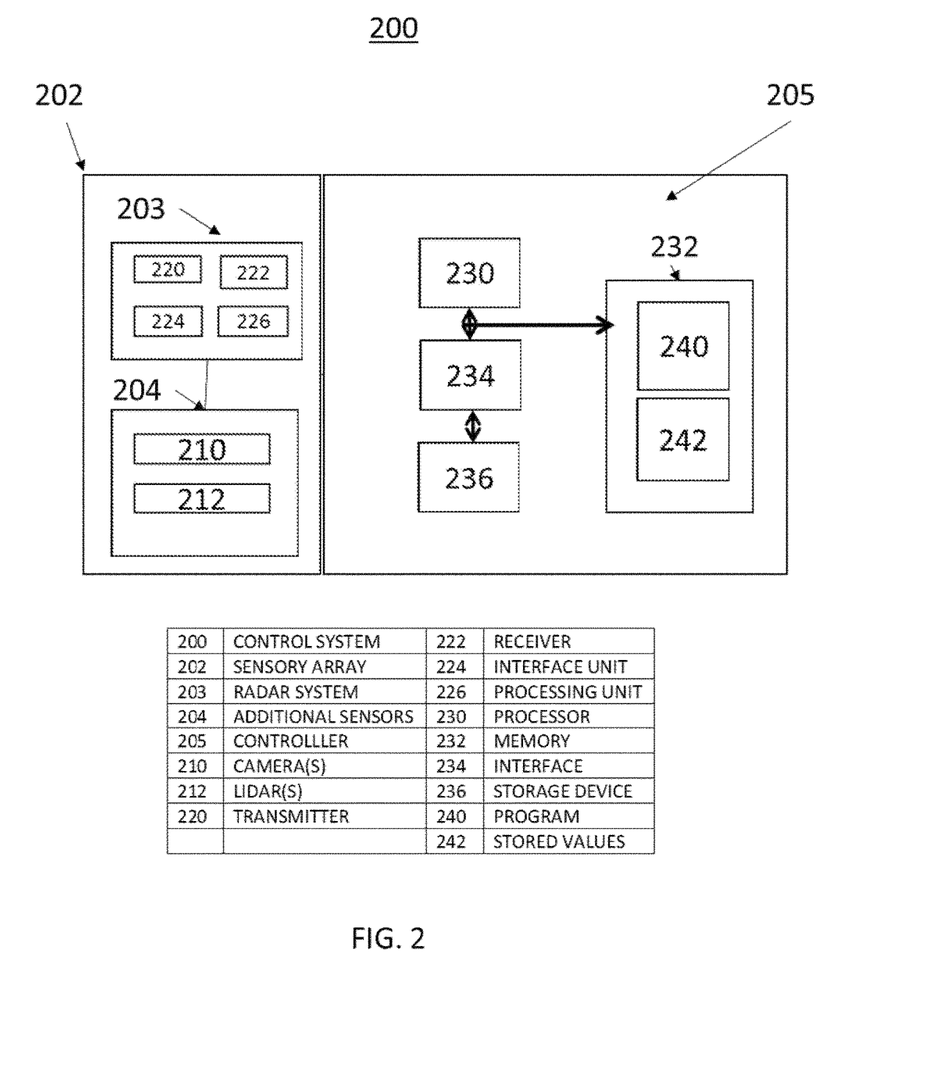
FIG. 2 illustrates an exemplary embodiment of a control system.

Turning now to FIG. 2, an exemplary embodiment of a control system 200 is shown. The control system 200 is operative to provide selective analysis of received radar signals of the radar system 203 based upon additional information provided by one or more additional sensors 204 having a different modality from the radar system 203. The control system generally consists of a sensor array 202 and a controller 205. While the control system 200, the radar system 203, and the additional sensors 204 are depicted as being part of the same system, it will be appreciated that in certain embodiments these features may comprise two or more systems. In addition, in various embodiments the control system 200 may comprise all or part of, and/or may be coupled to, various other vehicle devices and systems, such as, among others, an actuator assembly, and/or an electronic control system.

The sensor array 202 includes the radar system 203 and the one or more additional sensors 204. In the depicted embodiment, the additional sensors 204 include one or more cameras 210 and one or more light detection and ranging (LIDAR) systems 212. The camera(s) 210 and LIDAR system(s) 212 obtain respective sensor information identifying objects on or near a road in which the vehicle is travelling, such as another vehicle on the road and/or a guard rail or other object alongside the road.

The radar system 203 includes a transmitter 220 (also referred to herein as a transmitting channel) and a receiver 222 (also referred to herein as a receiving channel). The transmitter 220 transmits radar signals from the radar system 203. After the transmitted radar signals contact one or more objects on or near a road on which the vehicle is travelling and is reflected/redirected toward the radar system 203, the redirected radar signals are received by the receiver 222 of the radar system 103 for processing.

Furthermore, the radar system 203 also includes, among other possible features, an interface unit 224 and a processing unit 226 or a processor. The interface unit 224 receives information from the additional sensors 204 (e.g. from the one or more cameras 210 and LIDAR systems 212). The processing unit 226 processes, and selectively analyzes and interprets, the received radar signals along with the information from the additional sensors 204. The processing unit 226 of the illustrated embodiment is capable of executing one or more programs (i.e., running software) to perform various tasks instructions encoded in the program(s).

The processing unit 226 may be a microprocessor, microcontroller, application specific integrated circuit (ASIC) or other suitable device as realized by those skilled in the art. The radar system 203 may include multiple processing unit 226, working together or separately, as is also realized by those skilled in the art.

The controller 205 is coupled to the radar system 203 and the additional sensors 204 of the sensor array 202. Similar to the discussion above, in certain embodiments the controller 204 may be disposed in whole or in part within or as part of the radar system 203. In addition, in certain embodiments, the controller 205 is also coupled to one or more other vehicle systems. The controller 205 receives the information sensed or determined from the radar system 203 and the additional sensors 204. In addition, the controller 205 processes, and selectively analyzes and interprets, the received radar signals along with the information from the additional sensors 204. The controller 205 comprises a computer system. In certain embodiments, the controller 205 may also include one or more of the radar system 203, additional sensor(s) 204, and/or one or more other systems. In addition, it will be appreciated that the controller 205 may otherwise differ from the embodiment depicted in FIG. 2. For example, the controller 205 may be coupled to or may otherwise utilize one or more remote computer systems and/or other control systems in a vehicle.

In the depicted exemplary embodiment, the computer system of the controller 205 includes a processor 230, a memory 232, an interface 234, a storage device 236, and a bus 238. The processor 230 performs the computation and control functions of the controller 205, and may comprise any type of processor or multiple processors, single integrated circuits such as a microprocessor, or any suitable number of integrated circuit devices and/or circuit boards working in cooperation to accomplish the functions of a processing unit. During operation, the processor 230 executes one or more programs 240 contained within the memory 232 and, as such, controls the general operation of the controller 205 and the computer system of the controller 205.

The memory 232 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 232 is located on and/or co-located on the same computer chip as the processor 230. In the depicted embodiment, the memory 232 stores the above-referenced program 240 along with one or more stored values 242 for use in making the determinations.

The bus 238 serves to transmit programs, data, status and other information or signals between the various components of the computer system of the controller 205. The interface 234 allows communication to the computer system of the controller 205, for example from a system driver and/or another computer system, and can be implemented using any suitable method and apparatus. In one embodiment, the interface 234 obtains the additional data from the additional sensors 204 (e.g., camera data from the camera 210 and LIDAR data from the LIDAR system 212) for use in selectively analyzing the received radar signals of the radar system 203. The interface 234 can include one or more network interfaces to communicate with other systems or components. The interface 234 may also include one or more network interfaces to communicate with technicians, and/or one or more storage interfaces to connect to storage apparatuses, such as the storage device 236.

The storage device 236 can be any suitable type of storage apparatus, including direct access storage devices such as hard disk drives, flash systems, floppy disk drives and optical disk drives. In one exemplary embodiment, the storage device 236 comprises a program product from which memory 232 can receive a program 240 that executes one or more embodiments of one or more processes of the present disclosure. In another exemplary embodiment, the program product may be directly stored in and/or otherwise accessed by the memory 232 and/or a disk or disc drive, such as that referenced below.

The bus 238 can be any suitable physical or logical means of connecting computer systems and components. This includes, but is not limited to, direct hard-wired connections, fiber optics, infrared and wireless bus technologies. During operation, the program 240 is stored in the memory 232 and executed by the processor 230.

Figure 3:
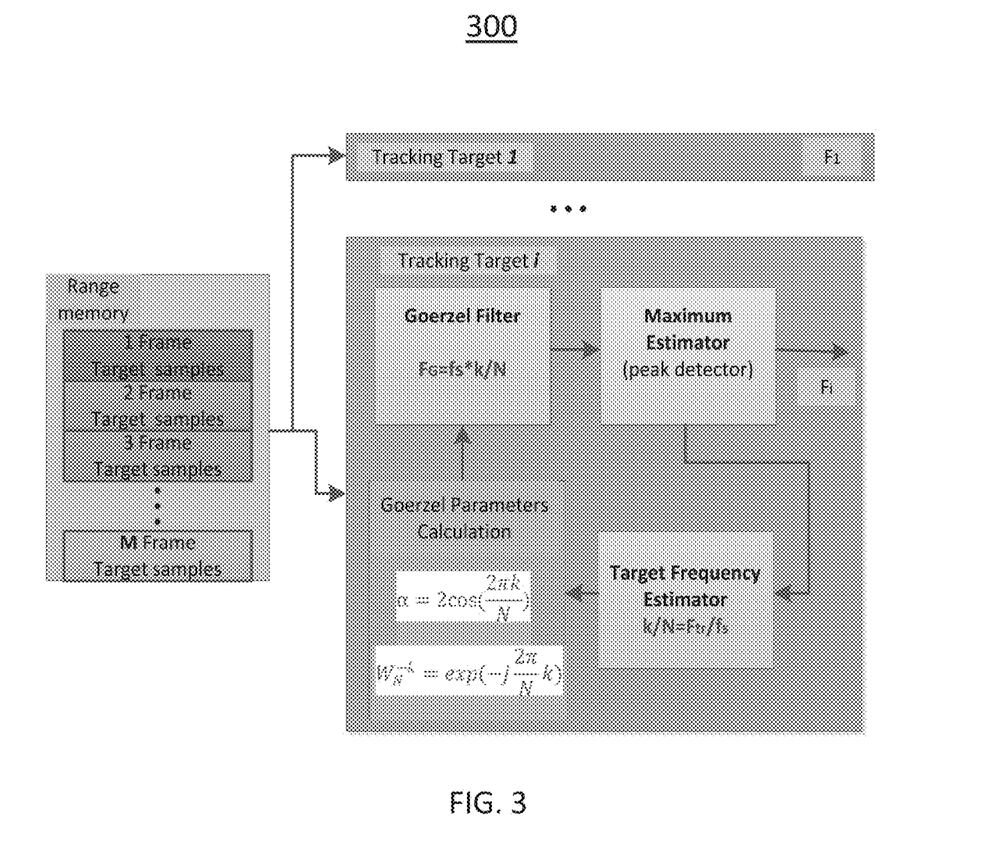
FIG. 3. Illustrates an exemplary block diagram of radar signal processing system.

Turning now to FIG. 3, an exemplary block diagram of radar signal processing system 300 is shown. The radar processing system may be implemented using discrete components, an integrated circuit, software, or any combination thereof. A memory 310 is used for storing radar echoes. The radar echoes, or target samples, are digital representations of transmitted electromagnetic signals reflected from a target and received via an antenna and radar receiver. The memory 310 is capable of storing a plurality of radar echoes and acts as a buffer for the signal processing processor 320. The radar echoes are digitized and stored in the memory 310, such as a random access memory (RAM), and indexed via a memory address. When requested the radar echoes is coupled to a digital signal processor or the like.

The radar signal processor 320 accesses the radar echoes stored on the memory and is operative to perform accurate target localization and tracking in range, Doppler and/or angle. After processing, the radar signal processor outputs a target tracking signal having a frequency and amplitude. The radar signal processor according to an exemplary system first applies a Goerzel filter 330 to the retrieved radar echo. The Goerzel filter 330 is a digital signal processing technique operative to for evaluation of individual terms of a discrete Fourier Transform (DFT). The Goerzel filter 330 analyses one selectable frequency from a discrete signal. Altering numerical parameters of the Goerzel filter alters the frequency response of the filter. The output of the Goertzel filter 330 is a narrowband digital signal.

The output of the Goertzel filter is coupled to a maximum estimator 340 which is operative to determine a maximum amplitude for the narrowband digital signal. The maximum estimator 340 may be a peak detector, or the like, is further operative to couple a control signal to a target frequency estimator 350 and to couple narrowband digital signal to subsequent radar signal processing systems. The control signal coupled to the target frequency estimator 350 may be a DC voltage equal to a peak value of the narrowband digital signal or a numerical representative of the peak value of the narrowband digital signal.

The target frequency estimator 350 is operative to receive a control signal indicative of the peak value of the narrowband digital signal and to generate a parameter control signal indicative of the estimated frequency of the narrowband digital signal. The target frequency estimator 350 then estimates the frequency of the narrowband digital signal in response to the combination of the control signal and the previously calculated parameter control signal. For example, in one exemplary method, if the previously calculated parameter control signal resulted in the center frequency of the Goerzel filter being shifted down in frequency and the control signal indicate a drop in amplitude, the target frequency estimator 350 may determine that the center frequency is actually higher than previously calculated. The parameters are adjusted until the control signal indicates a maximum peak value, thereby indicating that the Goerzel filter is centered on the frequency of the subject radar echo.

The Goerzel parameter calculator 360 is responsive to the parameter control signal and is operative to calculate the parameters used by the Goerzel filter. Adjusting the parameters alters the frequency response of the filter and/or the center frequency and/or bandwidth.

Figure 4:
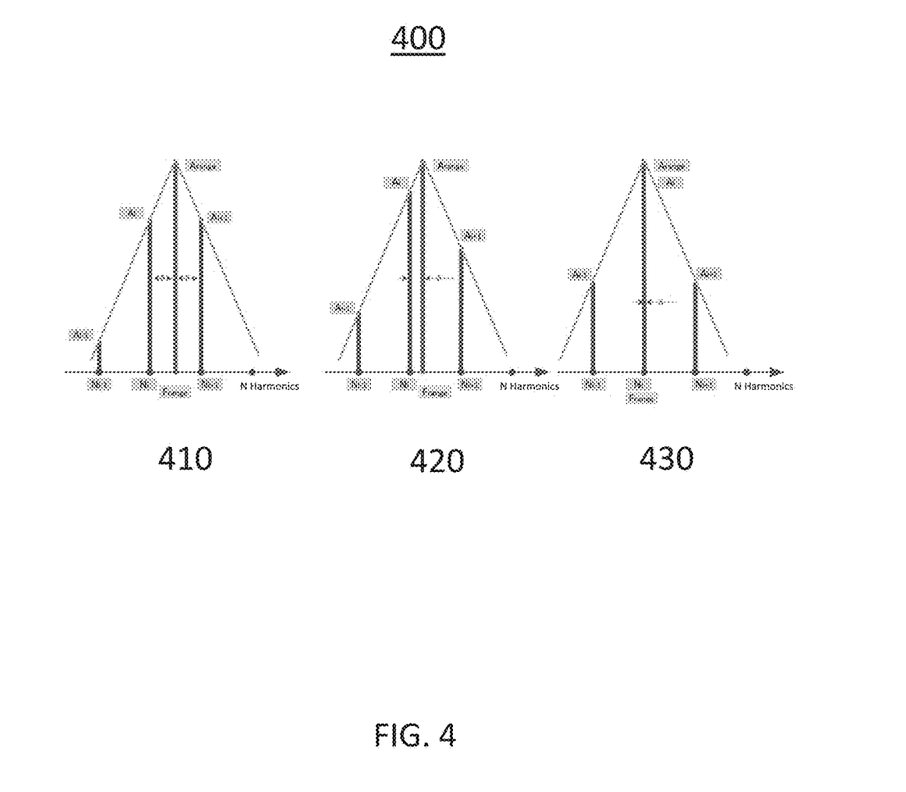
FIG. 4. shows a graphical representation of the frequency response of a Goerzel filter according to an exemplary system and method.

Turning now to FIG. 4 a graphical representation of the frequency response of a Goerzel filter according to an exemplary system and method. The first graph 410 illustrates a frequency response of a Goerzel filter when the center frequency of the filter is spaced equally between two harmonics of a radar signal.

This results in a peak value of any one of the harmonics being partially attenuated by the filter and thus having a lower peak amplitude.

The second graph 420 illustrates the frequency response of the Goerzel filter with the frequency response shifted down in frequency. The peak value of the desired signal Ai has an increased peak amplitude as less of the signal Ai is attenuated by the Goerzel filter. The third graph 430 where the frequency response has been further adjusted until the peak value has reached a maximum and therefore the frequency of the desired signal Ai is close to that of the center frequency of the Goerzel filter.

Figure 5:
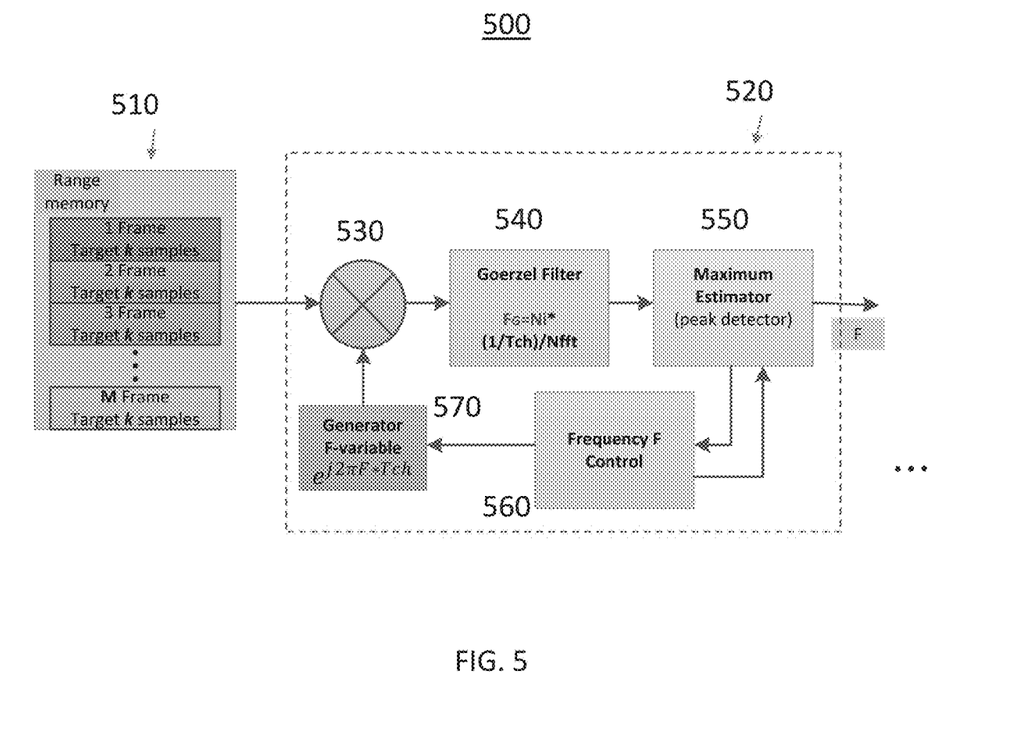
FIG. 5 shows an alternative exemplary block diagram of radar signal processing system.

Turning now to FIG. 5, an alternative exemplary block diagram of radar signal processing system 500 is shown. The radar processing system may be implemented using discrete components, an integrated circuit, software, or any combination thereof. A memory 510 is used for storing radar echoes. The radar echoes, or target samples, are digital representations of transmitted electromagnetic signals reflected from a target and received via an antenna and radar receiver. The memory 510 is capable of storing a plurality of radar echoes and acts as a buffer for the signal processing processor 520. The radar echoes are digitized and stored in the memory 510, such as a random access memory (RAM), and indexed via a memory address. When requested the radar echoes is coupled to a digital signal processor or the like.

A mixer 530 is operative to receive radar echoes from the memory 510 and shift the frequency of the radar echo in response to a control signal from the F-variable generator 570. The frequency shifted radar echo is applied to a Goerzel filter 540 for bandpass filtering. The Goerzel filter 540 is a digital signal processing technique operative to for evaluation of individual terms of a discrete Fourier Transform (DFT). The Goerzel filter 540 analyses one selectable frequency from a discrete signal. Altering numerical parameters of the Goerzel filter 540 alters the frequency response of the filter. The output of the Goertzel filter 540 is a narrowband digital signal.

The output of the Goerzel filter 540 is coupled to a maximum estimator 550 which is operative to determine a maximum amplitude for the narrowband digital signal. The maximum estimator 550 may be a peak detector, or the like, is further operative to couple a control signal to a frequency controller 560 and to couple narrowband digital signal to subsequent radar signal processing systems. The control signal coupled to the frequency controller 560 may be a DC voltage equal to a peak value of the narrowband digital signal or a numerical representative of the peak value of the narrowband digital signal.

The frequency controller 560 is operative to generate a frequency control signal in response to the control signal from the maximum estimator 550. The frequency control signal is coupled to the F-variable generator 570 such that the control signal applied to the mixer 530 alters the response of the Goerzel filter 540 in order to result in a peak amplitude at the maximum detector 550. As described previously, this results in the desired radar echo center frequency being aligned with the center frequency of the Goerzel filter 540.

Figure 6:
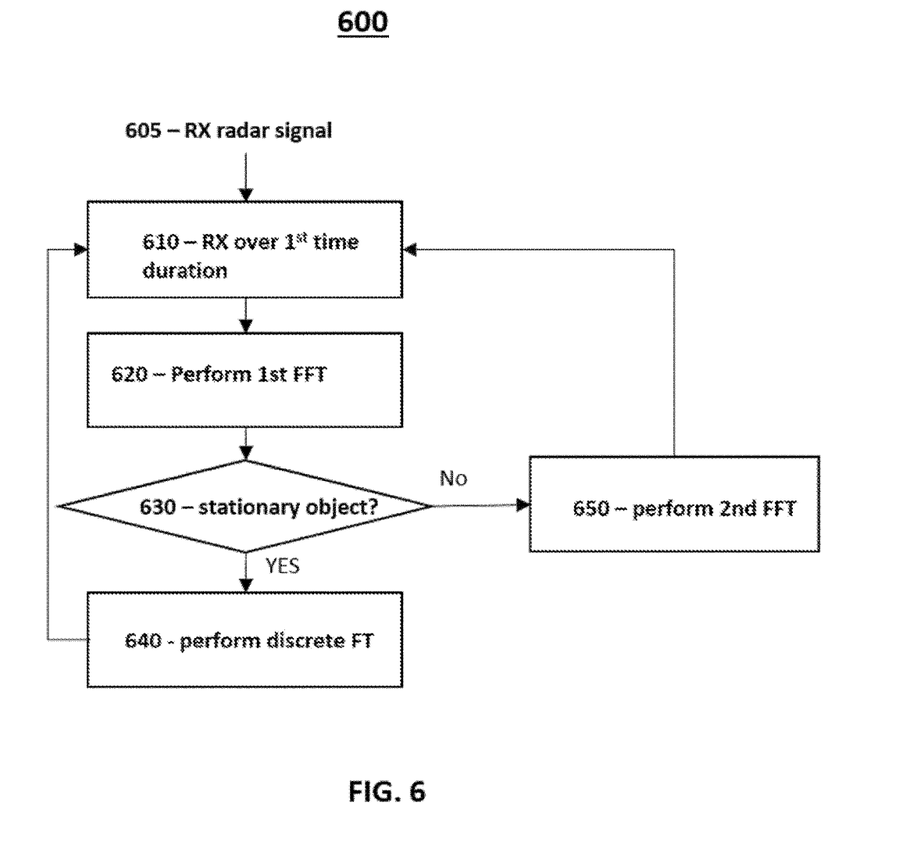
FIG. 6 shows a flow diagram according to an exemplary method of processing a radar signal.

Turning now to FIG. 6, a flow diagram 600 according to an exemplary method of processing a radar signal is shown. The method is first operative to receive a radar signal 605 over a first time duration 610. This radar signal may be stored in a memory or the like. The method is then operative to perform a fast Fourier transform on the radar over a first bandwidth to generate a first filtered radar signal 620. The method then determines if the first filtered radar signal indicates a stationary objection 630. If the determination is made that the radar signal indicates a stationary target, the radar signal is then processed by performing a discrete Fourier transform on said radar signal over the first bandwidth 640. If the determination is made that the radar signal does not indicate a stationary target, and therefore indicates a moving target, the radar signal is then processed using a fast Fourier transform 650. After the radar signal is processed, the method waits for a second radar signal received over a second time duration.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 230) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 205 may also otherwise differ from the embodiment depicted in FIG. 2, for example in that the computer system of the controller 205 may be coupled to or may otherwise utilize one or more remote computer systems and/or other control systems.

What is claimed is:

1. A method comprising:
   receiving a first radar signal over a first time duration,
   performing a first fast Fourier transform on said radar signal over a first bandwidth to generate a first filtered radar signal;
   determining if the first filtered radar signal indicates a stationary object;
   receiving the radar signal over a second time duration;
   performing a discrete Fourier transform on said radar signal over the first bandwidth in response to the determination that the first filtered radar signal indicates a stationary object; and
   determining that the first filtered radar signal indicates a moving target and tracking the moving target using a shortened fast Fourier transform on the radar signal over the first bandwidth.

2. The method of claim 1 further comprising filtering the first filtered radar signal using a Goertzel algorithm and adjusting the first bandwidth to estimate a peak signal.

3. The method of claim 1 comprising determining if the first filtered radar signal indicates a moving object and performing a second fast Fourier transform in response to the determination that the first filtered radar signal indicates a moving object.

4. The method of claim 3 wherein the second fast Fourier transform has a shorter length than the first fast Fourier transform.

5. The method of claim 1 further comprising generating a control signal in order to control an autonomous vehicle in response to the determination of the stationary object.

6. An apparatus comprising:
   a transmitter for transmitting a pulsed radar signal,
   a receiver for receiving a radar signal over a first time duration and a second time duration wherein the radar signal is a reflection of the pulsed radar signal;
   a processor for performing a fast fourier transform on said radar signal over a first bandwidth to generate a first filtered radar signal, determining if the first filtered radar signal indicates a stationary objection and for performing a discrete fourier transform on said radar signal over the first bandwidth in response to the determination that the first filtered radar signal indicates a stationary object.

7. The apparatus of claim 6 wherein the processor is further operative to determine that the first filtered radar signal indicates a moving target and tracking the moving target using a shortened fast Fourier transform on the radar signal over the first bandwidth.

8. The apparatus of claim 6 wherein said processor is further operative to filter the first filtered radar signal using a Goertzel algorithm and to adjust the first bandwidth to estimate a peak signal.

9. The apparatus of claim 6 wherein the processor is further operative to determine if the first filtered radar signal indicates a moving object and performing a second fast Fourier transform in response to the determination that the first filtered radar signal indicates a moving object.

10. The apparatus of claim 9 wherein the second fast Fourier transform has a shorter length than the first fast Fourier transform.

11. The apparatus of claim 6 wherein the processor is further operative to generate a control signal in order to control an autonomous vehicle in response to the determination of the stationary object.

12. The apparatus of claim 6 further comprising:
    a memory for storing the first filtered radar signal;
    a reference signal generator for generating a reference signal in response to a phase shift signal;
    a bandpass filter for filtering the first filtered radar signal to generate a second filtered radar signal wherein the bandpass filter has a frequency response responsive to the phase shift signal; and
    a peak detector for determining an amplitude of the second filtered radar signal, wherein the peak detector is further operative to generate a control signal indicating an amplitude and couple the control signal to the reference signal generator, and wherein the reference signal generator is operative to adjust the reference signal in response to the control signal.

13. A method comprising:
    receiving a first radar signal over a first time duration covering a first field of view;
    processing the first radar signal using a fast Fourier transform;
    receiving a second radar signal over a second time duration over the first field of view;
    processing the second radar signal using a discrete Fourier transform; and
    determining that the first radar signal indicates a moving target and tracking the moving target using a shortened fast Fourier transform on the radar signal over the first bandwidth.

14. The method of claim 13 further comprising determining that the first radar signal indicates a stationary target and tracking the stationary target using a discrete Fourier transform on the radar signal over the first bandwidth.

15. The method of claim 13 further comprising filtering the first radar signal using a Goertzel algorithm and adjusting the frequency response of the Goertzel algorithm to estimate a peak amplitude of the first radar signal.

16. The method of claim 13 comprising determining if the first radar signal indicates a moving object and performing a second fast Fourier transform in response to the determination that the first radar signal indicates a moving object.

17. The method of claim 16 wherein the second fast Fourier transform has a shorter length than the first fast Fourier transform.

18. The method of claim 13 further comprising generating a control signal in order to control an autonomous vehicle in response to the determination of the stationary object.

* * * * *